US011505007B2

(12) United States Patent
Kagimoto (10) Patent No.: US 11,505,007 B2
(45) Date of Patent: Nov. 22, 2022

(54) TIRE

(71) Applicant: Sumitomo Rubber Industries, Ltd., Hyogo (JP)

(72) Inventor: Shuji Kagimoto, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 503 days.

(21) Appl. No.: 16/224,654

(22) Filed: Dec. 18, 2018

(65) Prior Publication Data

US 2019/0202242 A1 Jul. 4, 2019

(30) Foreign Application Priority Data

Dec. 28, 2017 (JP) .............................. JP2017-253827

(51) Int. Cl.
*B60C 11/11* (2006.01)
*B60C 11/03* (2006.01)
(Continued)

(52) U.S. Cl.
CPC ...... *B60C 11/0309* (2013.01); *B60C 11/0306* (2013.01); *B60C 11/11* (2013.01); *B60C 11/1204* (2013.01); *B60C 11/1236* (2013.01); *B60C 11/1307* (2013.01); *B60C 11/12* (2013.01); *B60C 11/1384* (2013.01); *B60C 11/1392* (2013.01); *B60C 2011/0346* (2013.01);
(Continued)

(58) Field of Classification Search
CPC ............. B60C 11/1384; B60C 11/1392; B60C 11/0306; B60C 11/1315
See application file for complete search history.

(56) References Cited

U.S. PATENT DOCUMENTS

2007/0006955 A1* 1/2007 Fukunaga ........... B60C 11/0302
152/209.24
2008/0230164 A1* 9/2008 Nishitani ............ B60C 11/1392
152/209.18
(Continued)

FOREIGN PATENT DOCUMENTS

EP 3023268 A1 5/2016
EP 3059101 A1 8/2016
(Continued)

OTHER PUBLICATIONS

Extended European Search Report issued by the European Patent Office dated May 2, 2019, which corresponds to EP18213122.7-1012 and is related to U.S. Appl. No. 16/224,654.

*Primary Examiner* — Timothy Kennedy
*Assistant Examiner* — Farah Taufiq
(74) *Attorney, Agent, or Firm* — Studebaker & Brackett PC (57) ABSTRACT

A tire comprises a tread portion provided with zigzag circumferential grooves and lateral grooves so that hexagonal blocks are formed between the zigzag circumferential grooves. Corners of the hexagonal blocks adjacent to each other through the lateral grooves are partially chamfered to have chamfered parts, with respect to each of the lateral grooves, the chamfered part of the corner of the hexagonal block abutting on the lateral groove on one side in the tire circumferential direction is located in a different position in the longitudinal direction of the lateral groove than the chamfered part of the corner of the hexagonal block abutting on the lateral groove on the other side in the tire circumferential direction.

20 Claims, 6 Drawing Sheets

(51) Int. Cl.
*B60C 11/12* (2006.01)
*B60C 11/13* (2006.01)
(52) U.S. Cl.
CPC ............... *B60C 2011/0348* (2013.01); *B60C 2011/0353* (2013.01); *B60C 2011/0358* (2013.01); *B60C 2011/0365* (2013.01); *B60C 2011/0372* (2013.01); *B60C 2011/1213* (2013.01); *B60C 2011/133* (2013.01); *B60C 2200/06* (2013.01)

(56) References Cited

U.S. PATENT DOCUMENTS

| | | |
|---|---|---|
| 2011/0232815 A1* | 9/2011 | Nakamizo ........... B60C 11/0306 152/209.18 |
| 2015/0165825 A1* | 6/2015 | Kobayashi ............. B60C 11/11 152/209.21 |
| 2016/0159158 A1* | 6/2016 | Washizuka ............ B60C 11/125 152/209.8 |
| 2017/0008349 A1* | 1/2017 | Tanaka ................ B60C 11/1218 |
| 2017/0106701 A1 | 4/2017 | Ito |

FOREIGN PATENT DOCUMENTS

| | | | |
|---|---|---|---|
| EP | 3156264 A1 | 4/2017 | |
| EP | 3208113 B1 * | 5/2019 | ........... B60C 11/125 |
| GB | 1549347 A * | 8/1979 | ........ B60C 11/1376 |
| JP | 2003170708 A * | 6/2003 | ........ B60C 11/1392 |
| JP | 2011073471 A * | 4/2011 | |
| JP | 2013035345 A * | 2/2013 | |
| JP | 2017-074844 A | 4/2017 | |

* cited by examiner

TIRE

TECHNICAL FIELD

The present invention relates to a tire, more particularly to a tread pattern capable of improving the resistance to stone entrapment, thus, suitable for a heavy duty tire.

BACKGROUND ART

A heavy duty tire having a plurality of hexagonal blocks arranged in a tread portion has been widely adopted (see Patent Document 1, for example). This type of tire has a plurality of circumferential grooves extending in the tire circumferential direction in a zigzag manner. And each land portion formed between the zigzag circumferential grooves adjacent in tire axial direction is divided into hexagonal blocks by a plurality lateral grooves connecting between their zigzag vertices respectively.

In such a hexagonal block, the central portion of the block in the tire circumferential direction has a wider width and a larger internal angle at each corner. Therefore, as compared with a rectangular block for example, the rigidity is high and the rigidity balance is excellent. As a result, the movement and deformation of the hexagonal block at the time of contacting with the ground can be suppressed to low levels, which is advantageous for wear resistance.

Patent Document 1: Japanese Patent Application Publication No. 2017-74844

SUMMARY OF THE INVENTION

Problems to be Solved by the Invention

However, when the movement and deformation of the hexagonal block is small, stone entrapment tends to occur in lateral grooves adjacent to the block. Therefore, as a measure against such stone entrapment, it has been known to provide a raised part in the groove bottom in order to suppress stone entrapment. Such raised part however, reduces the groove volume, which is disadvantageous for wet performance.

It is therefore, an object of the present invention to provide a tire in which occurrence of stone entrapment in lateral grooves can be effectively suppressed while securing good wet performance, and which is therefore suitably embodied as a heavy duty tire.

According to the present invention, a tire comprises:
a tread portion provided with
zigzag circumferential grooves each extending in the tire circumferential direction in a zigzag manner so as to have zigzag vertices, and
lateral grooves connecting the zigzag vertices of the zigzag circumferential grooves adjacent to each other in the tire axial direction so that a land portion between the zigzag circumferential grooves adjacent to each other in the tire axial direction is divided into a plurality of hexagonal blocks, wherein
corners of the hexagonal blocks adjacent to each other through the lateral grooves are partially chamfered to have chamfered parts, wherein the corner of each said hexagonal block is formed between a ground contacting top surface of the hexagonal block and a side wall surface of the hexagonal block facing the lateral groove, and
with respect to each of the lateral grooves, the chamfered part of the corner of the hexagonal block abutting on the lateral groove on one side in the tire circumferential direction, is located in a different position in the longitudinal direction of the lateral groove than the chamfered part of the corner of the hexagonal block abutting on the same lateral groove on the other side in the tire circumferential direction.

Further, the tire according to the present invention may have the following features (1)-(6):
(1) the zigzag circumferential grooves include two shoulder circumferential grooves and two or three crown circumferential grooves disposed therebetween, and
the two shoulder circumferential grooves have a wider groove width than groove widths of the crown circumferential grooves;
(2) the crown circumferential grooves have a groove width of not more than 3.0 mm;
(3) the length L10 of each said chamfered part measured along the lateral groove is in a range from 40% to 60% of the length L13 of the corner measured along the lateral groove;
(4) the chamfered parts have an angle θ in a range from 10 to 30 degrees with respect to a normal line to the block's ground contacting top surface;
(5) the depth D10 of the chamfered parts is in a range from 50% to 80% of the depth D2 of the lateral groove;
(6) the hexagonal blocks are each provided with a sipe extending across the hexagonal block in the tire axial direction.

Therefore, in the tire according to the present invention, the side wall surfaces of the lateral groove are provided with the chamfered parts in the different positions in the longitudinal direction of the lateral groove. As a result, even if a foreign object such as stone is entrapped in the lateral groove, the foreign object is easily self ejected by asymmetric movements of the side wall surfaces due to the asymmetric structure of the lateral groove. Thus, the occurrence of stone entrapment is effectively suppressed. Further, the groove volume of the lateral grooves is not lowered, rather increased by the chamfered parts, therefore, it is possible to maintain or improve the wet performance.

DESCRIPTION OF THE PREFERRED EMBODIMENTS

An embodiment of the present invention will now be described in detail in conjunction with accompanying drawings.

Figure 1:
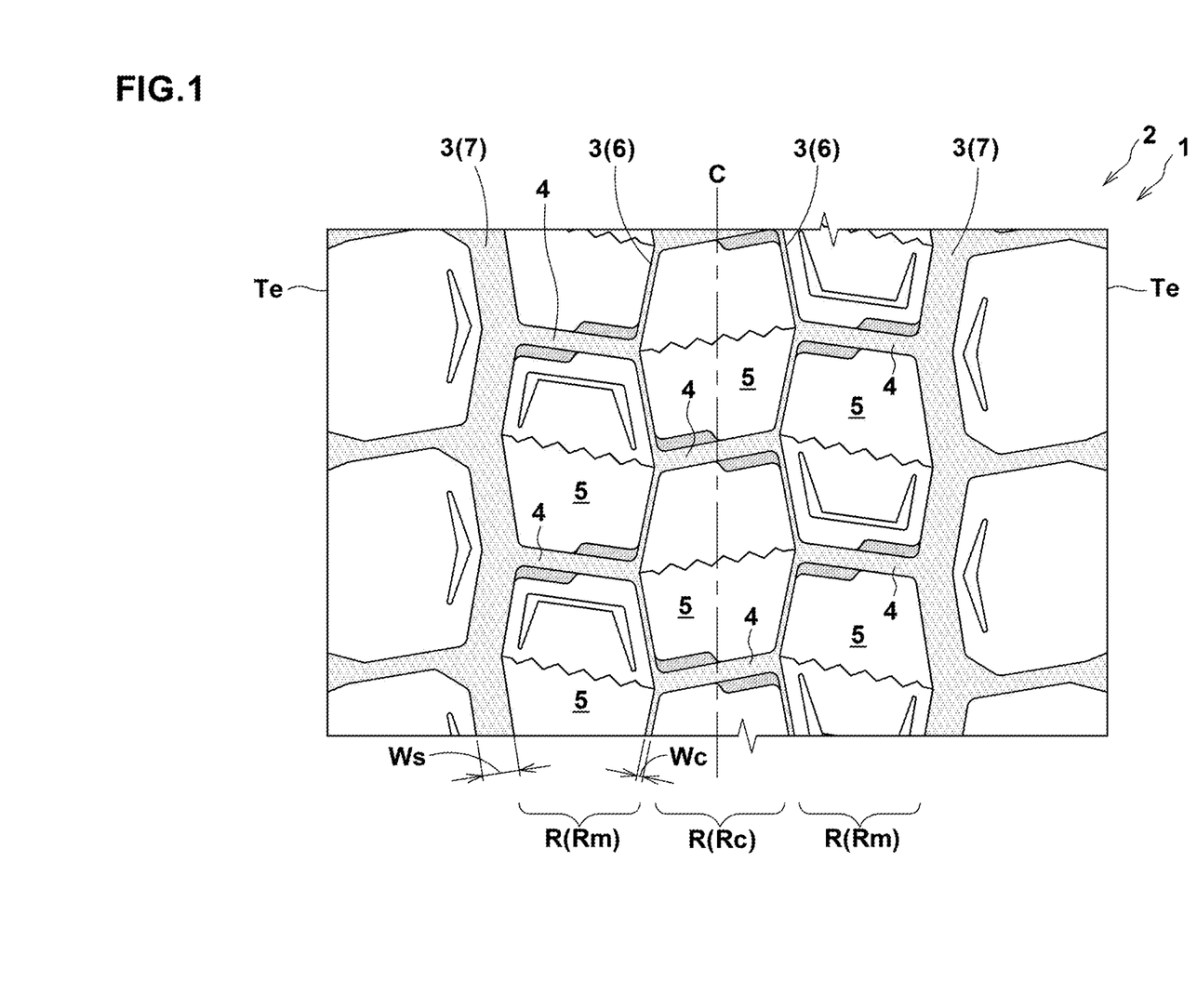
FIG. 1 is a developed partial view of a tread portion of a tire as an embodiment of the present invention.

FIG. 1 shows a part of the tread portion 2 of a tire 1 as an embodiment of the present invention. In this embodiment, the tire 1 is a heavy duty pneumatic tire.

However, the present invention can be applied to various tires, for example, pneumatic tires for passenger cars, commercial vehicles and the like, as well as non-pneumatic tires such as airless tires.

As shown in FIG. 1, the tread portion 2 of the tire 1 is provided with a plurality of zigzag circumferential grooves 3 each extending in the tire circumferential direction in a zigzag manner. Further, the tread portion 2 is provided with lateral grooves 4 connecting between the zigzag circumferential grooves 3 which are adjacent to each other in the tire axial direction. Thereby, a land portion R defined between the axially adjacent zigzag circumferential grooves 3 is divided into a plurality of hexagonal blocks 5.

In this example, the plurality of zigzag circumferential grooves 3 includes two crown circumferential grooves 6 and two shoulder circumferential grooves 7.

The two crown circumferential grooves 6 are disposed one on each side of the tire equator C. The two shoulder circumferential grooves 7 are disposed axially outside the respective crown circumferential grooves 6.

In this example, the crown circumferential grooves 6 have a groove width wc of not more than 3.0 mm, and the shoulder circumferential grooves 7 have a groove width ws larger than the groove width wc.

Hereinafter, a region of the tread between the two shoulder circumferential grooves 7 may be referred to as the crown region, and regions between the shoulder circumferential grooves 7 and the tread edges Te as the shoulder regions.

Figure 2A:
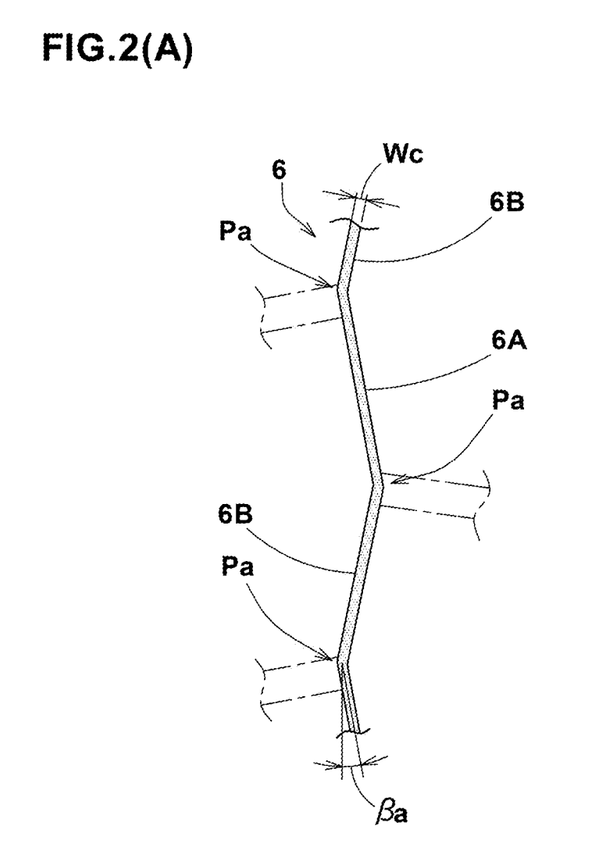
FIG. 2(A) is a partial top view of a crown circumferential groove.

The crown circumferential groove 6 is made up of alternately arranged first inclined groove segments 6A and second inclined groove segments 6B, both inclined with respect to the tire circumferential direction, wherein, as shown in FIG. 2(A), the first inclined groove segments 6A are inclined to one side (lower right side in the figure) whereas the second inclined groove segments 6B are inclined to the other side (lower left side in the figure).

The junctions between the first inclined groove segments 6A and the second inclined groove segments 6B are referred to as the zigzag vertices Pa.

Figure 2B:
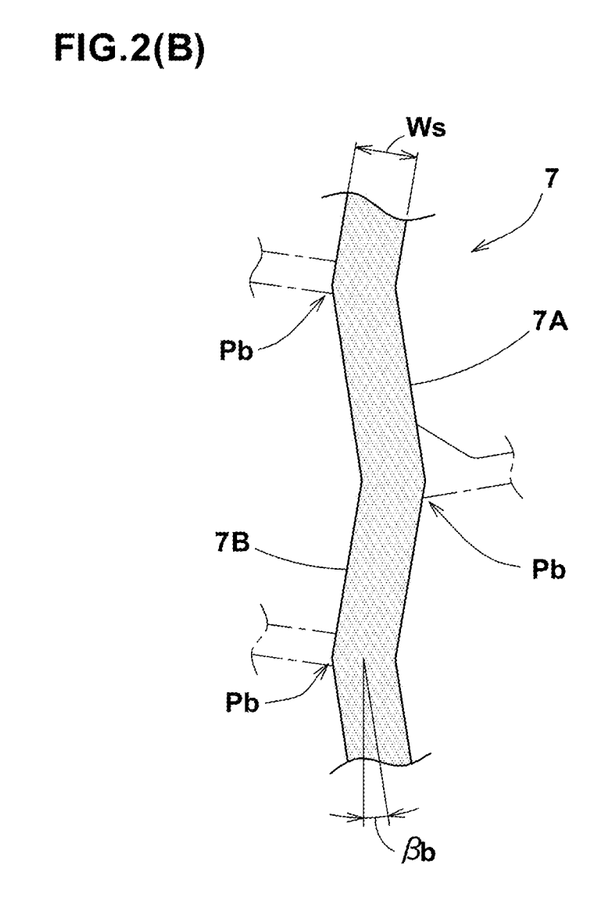
FIG. 2(B) is a partial top view of a shoulder circumferential groove.

The shoulder circumferential groove 7 is made up of alternately arranged first inclined groove segments 7A and second inclined groove segments 7B, both inclined with respect to the tire circumferential direction, wherein, as shown in FIG. 2(B), the first inclined groove segments 7A are inclined to one side (lower right side in the figure) whereas the second inclined groove segments 7B are inclined to the other side (lower left side in the figure).

The junctions between the first inclined groove segments 7A and the second inclined groove segments 7B are referred to as the zigzag vertices Pb.

The crown circumferential grooves 6 and the shoulder circumferential grooves 7 have the same number of the vertices Pa and Pb per one tire circumference.

Figure 3:
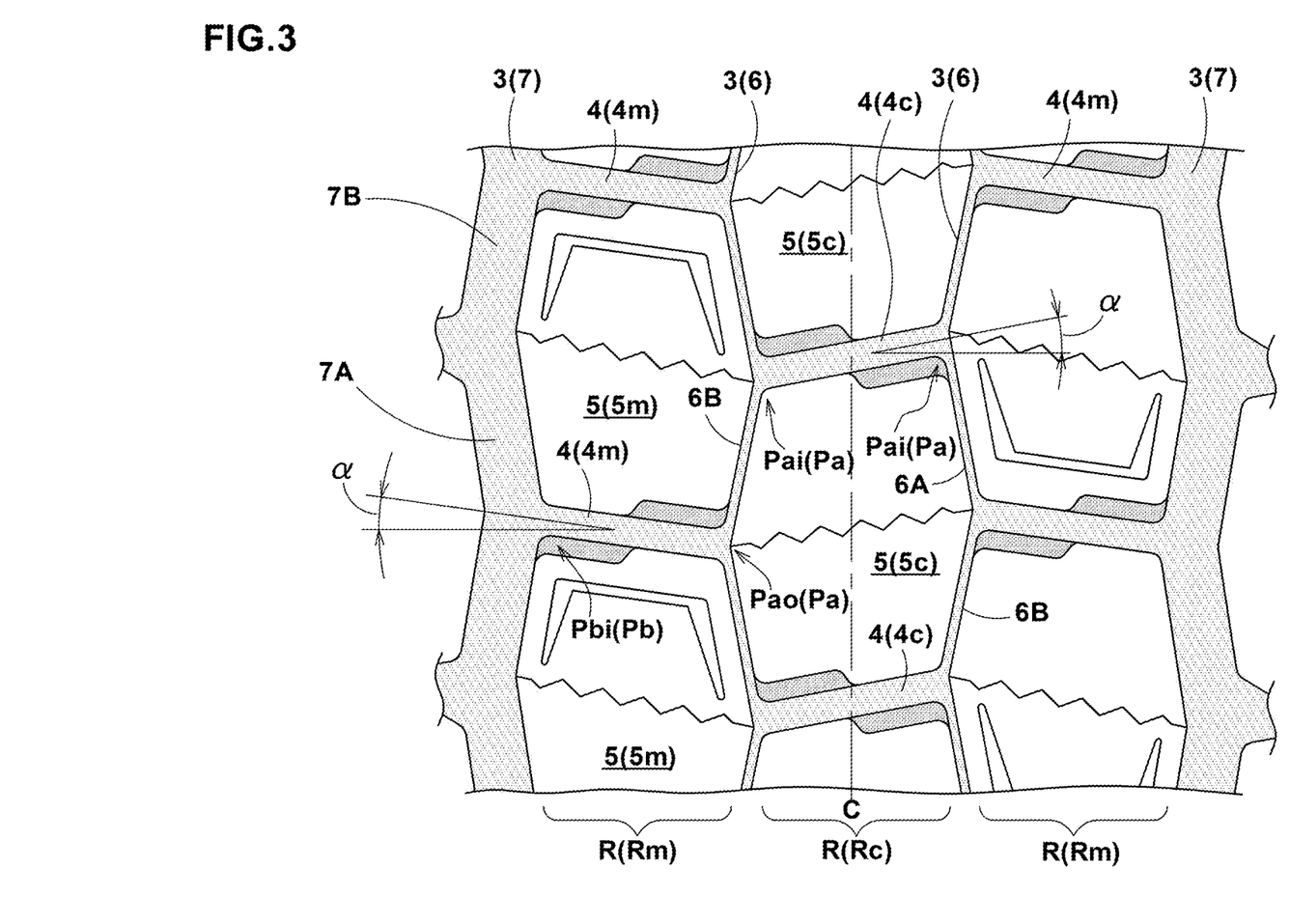
FIG. 3 is an enlarged view of a main part of the tread portion showing hexagonal blocks disposed in a tread crown region.

As shown in FIG. 3, between the two crown circumferential grooves 6, there is formed a land portion Rc (hereinafter the center land portion Rc).

The phase of the zigzag of one of the two crown circumferential grooves 6 is shifted in the tire circumferential direction from that of the other crown circumferential groove 6 by about one half of one zigzag pitch. As a result, the center land portion Rc is provided with wide sections and narrow sections which alternately occur in the circumferential direction.

The center land portion Rc is provided with the above-said lateral grooves 4c extending across the respective narrow sections. In other words, the lateral grooves 4c extend between radially inwardly protruding vertices Pai of the vertices Pa of one crown circumferential groove 6 and radially inwardly protruding vertices Pai of the vertices Pa of the other crown circumferential groove 6.

In the tire circumferential direction, each of the vertices Pai is located between the groove walls on both sides of the lateral groove 4c which extends to the vertex Pai concerned.

As a result, the center land portion Rc is divided into a plurality of hexagonal blocks 5c each surrounded by the lateral grooves 4c and the first and second inclined groove segments 6A and 6B.

Such hexagonal block 5c has a hexagonal shape with a width increasing from both ends in the tire circumferential direction toward a center portion in the tire circumferential direction.

Between each of the crown circumferential grooves 6 and the shoulder circumferential groove 7 axially outside thereof, there is formed a land portion Rm (hereinafter, the middle land portion Rm).

The phase of the zigzag of the above-said crown circumferential groove 6 is shifted in the tire circumferential direction from that of the above-said shoulder circumferential groove 7 by about one half of one zigzag pitch.

As a result, each middle land portion Rm is provided with wide sections and narrow sections which alternately occur in the circumferential direction.

Each of the middle land portions Rm is provided with lateral grooves 4m extending across the respective narrow sections. Specifically, the lateral grooves 4m extend between axially outwardly protruding vertices Pao of the vertices Pa of the crown circumferential groove 6 and axially inwardly protruding vertices Pbi of the vertices Pb of the shoulder circumferential groove 7.

In the tire circumferential direction, each of the vertices Pao and Pbi is located between the groove walls on both sides of the lateral groove 4m which extends to the vertex Pao or Pbi concerned.

As a result, the middle land portion Rm is divided into a plurality of hexagonal blocks 5m each surrounded by the lateral grooves 4m and the first inclined groove segments 6A and 7A and the second inclined groove segments 6B and 7B. Such hexagonal block 5m has a hexagonal shape with a width increasing from both ends in the tire circumferential direction toward a center portion in the tire circumferential direction.

In such hexagonal blocks 5c and 5m, the central portion in the tire circumferential direction of the block is wider and the interior angle of each corner in the central portion is also large. Therefore, it has higher rigidity and better rigidity balance as comparison with rectangular blocks. Therefore, the movement and deformation of the block at the time of contacting with the ground can be suppressed to low levels, which is advantageous for wear resistance.

Figure 5A:
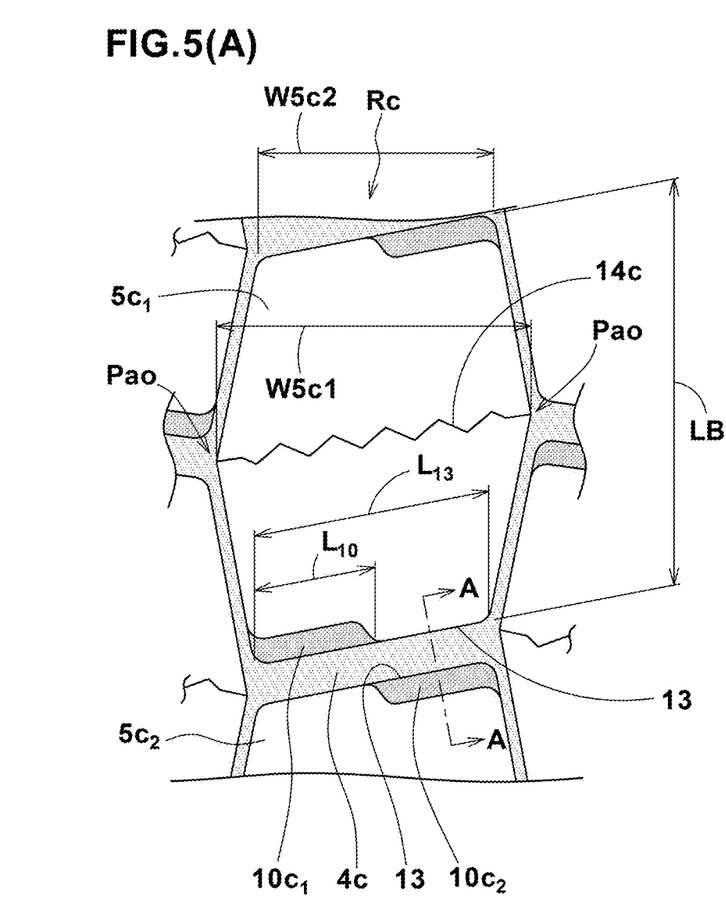
FIG. 5(A) is a top views of a hexagonal block.

As shown in FIG. 5(A), the maximum axial width W5c1 of the hexagonal block 5c between the mostly axially protruding positions of both side faces of the block is preferably set in a range from 1.2 to 1.5 times an axial width W5c2 of the hexagonal block 5c at the end in the tire circumferential direction.

Figure 5B:
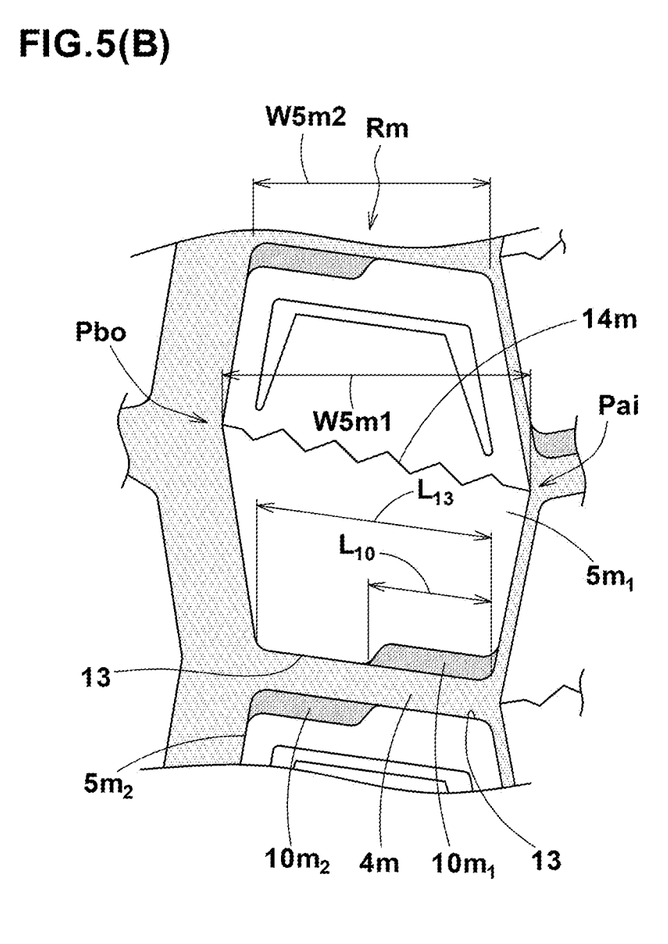
FIG. 5(B) is a top views of another hexagonal block.

As shown in FIG. 5(B), the maximum axial width W5m1 of the hexagonal block 5m between the mostly axially protruding positions of the both side faces of the block is preferably set in a range from 1.2 to 1.5 times an axial width W5m2 of the hexagonal block 5m at the end in the tire circumferential direction.

In this example, the lateral grooves 4c and the lateral grooves 4m have a depth D2 (shown in FIG. 6), and the crown circumferential grooves 6 and the shoulder circumferential grooves 7 have a depth D1 (not shown), wherein the depth D2 is equal to the depth D1.

In the case of heavy duty tire, the depths D1 and D2 are preferably set in a range from 10 to 16.5 mm.

The lateral grooves 4c and 4m are preferably inclined with respect to the tire axial direction, and in view of balance between traction performance and wet performance, it is preferred that the lateral grooves 4c and 4m have angles α of from 4 to 18 degrees with respect to the tire axial direction.

It is also preferable that the lateral grooves 4c are oriented in an opposite direction to the lateral grooves 4m.

In the tire 1 in this example, the groove width wc of the crown circumferential grooves 6 is set to be not more than 3.0 mm in order to further improve the wear resistance.

With such narrow crown circumferential grooves 6, the adjacent hexagonal blocks 5c and 5m can contact with each other via the crown circumferential grooves 6 to support each other when subjected to a longitudinal force and lateral force from the ground at the time of contacting with the ground.

Figure 4:
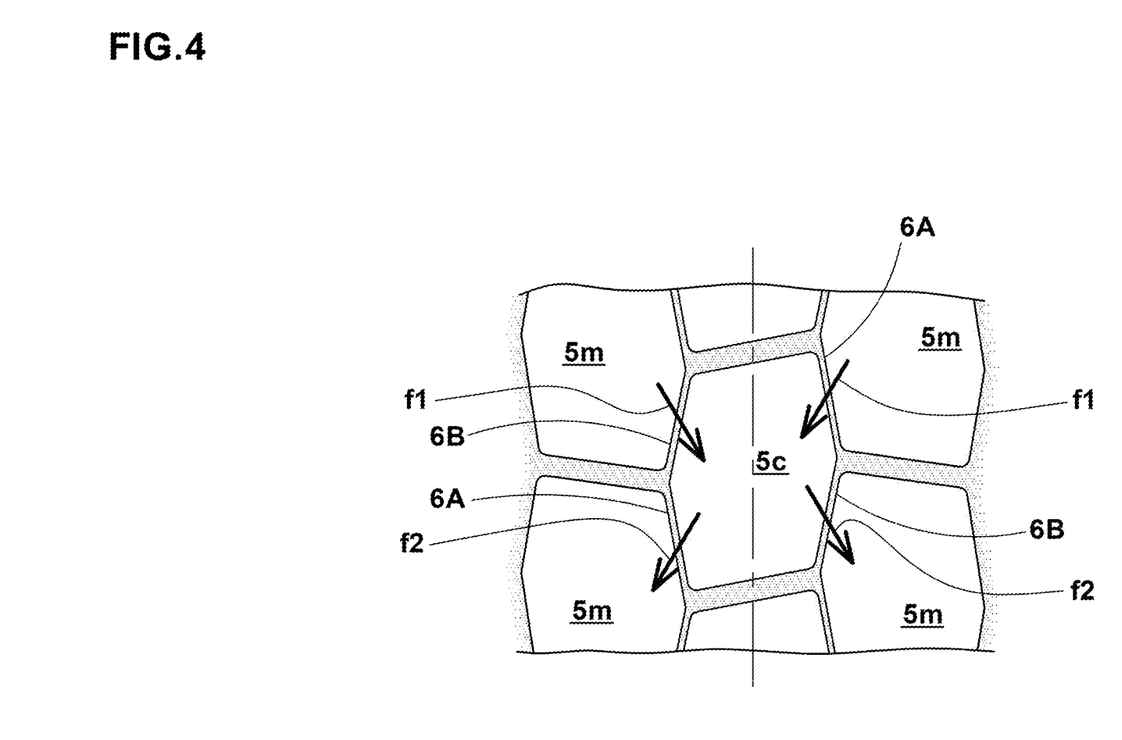
FIG. 4 is a diagram for explaining the action and effect of the present invention.

More specifically, when contacting with the ground, for example as shown in FIG. 4, a hexagonal block 5m receives a force from the road surface and is moved in a direction of an arrow f1. As a result, an inclined groove segment (6A or 6B) of the crown circumferential groove 6 is closed, and the hexagonal block 5m can contact with the adjacent hexagonal block 5c.

Similarly, for example, when a hexagonal block 5c is moved in a direction of an arrow f2 due to a force from the road surface, an inclined groove segment (6A or 6B) of the crown circumferential groove 6 is closed and the hexagonal block 5c can contact with the adjacent hexagonal block 5m.

In this way, the hexagonal blocks 5c and 5m can contact each other to support each other because the crown circumferential grooves 6 are zigzag grooves and the groove width wc is as narrow as 3.0 mm or less. Such mutual support of the hexagonal blocks 5c and 5m is also demonstrated when moved in the tire circumferential direction.

Therefore, it is possible to further improve the wear resistance of each block and the wear resistance of the entire crown region, which can greatly contribute to suppression of center wear. In heavy duty tires, especially, the ground contact pressure in the tread crown region is high, and the progress of wear in the tread crown region is fast, therefore, the suppression of center wear can greatly contribute to improvement of the tire life.

When the groove width wc of the crown circumferential grooves 6 exceeds 3.0 mm, it becomes difficult for the hexagonal blocks 5c and 5m to support each other. Therefore, the groove width wc is preferably set to be not more than 2.5 mm. From the viewpoint of the wet performance, the groove width wc is preferably not less than 1.0 mm, more preferably not less than 1.5 mm.

If the zigzag angle βa (shown in FIG. 2(A)) with respect to the tire circumferential direction of the crown circumferential groove 6 is too small, it becomes difficult for the hexagonal blocks 5c and 5m to support each other. Therefore, the angle βa is preferably set to be not less than 5 degrees. From the viewpoint of wet performance, the zigzag angle βa is preferably not more than 20 degrees.

Here, the zigzag angle βa is defined as an angle with respect to the tire circumferential direction of the first and second inclined groove segments 6A and 6B.

The zigzag angle βa of the first inclined groove segments 6A may be different from the zigzag angle βa of the second inclined groove segments 6B.

Further, the zigzag angle βa can be varied within the above range, for example, when a variable pitching method is adopted.

In view of the rigidity balance between the hexagonal blocks 5c and the hexagonal blocks 5m, it is preferable that the zigzag angle βb (shown in FIG. 2(B)) with respect to the tire circumferential direction of the shoulder circumferential groove 7 is limited to the same angular range as the zigzag angle βa although this is not essential.

Here, the zigzag angle βb is defined as an angle with respect to the tire circumferential direction of the first and second inclined groove segments 7A and 7B.

The zigzag angle βb of the first inclined groove segments 7A may be different from the zigzag angle βb of the second inclined groove segments 7B.

Further, the zigzag angle βb can be varied within the above range, for example, when a variable pitching method is adopted.

In the tire 1, as described above, since (a) the hexagonal blocks 5c and 5m themselves have higher rigidity and higher rigidity balance than the rectangular blocks; and (b) the crown circumferential grooves 6 are so narrow and the hexagonal blocks 5c and 5m can support each other: the movement and deformation of the block is suppressed. As a result, stone entrapment in the lateral grooves 4c and 4m tends to occur.

Figure 6:
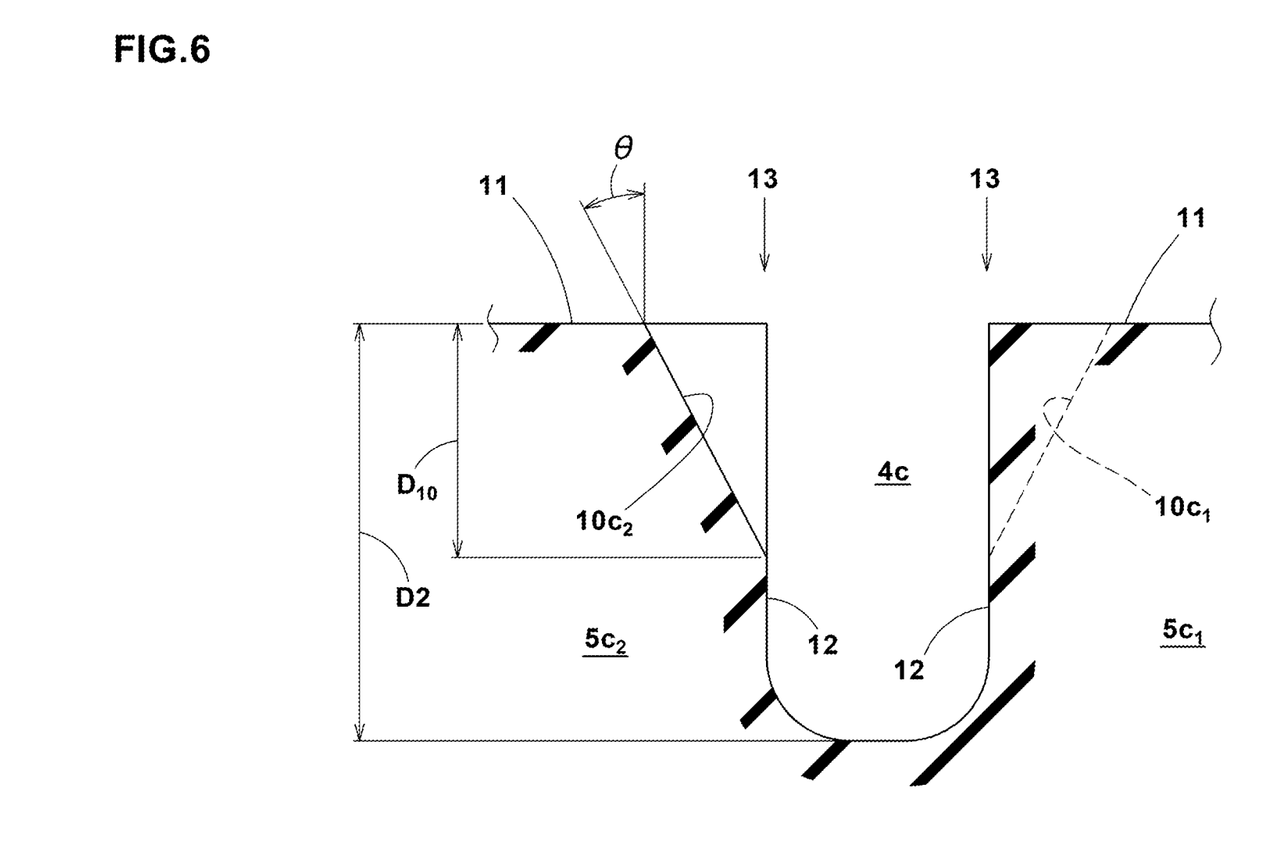
FIG. 6 is a sectional view taken along line A-A in FIG. 5(A) showing the chamfered part.

Therefore, according to the present invention, as shown in FIGS. 5(A) and 6, in order to prevent the stone entrapment in the center land portion Rc, corners of the hexagonal blocks 5c which corners abut on the lateral grooves 4c are each partially chamfered to have a chamfered part (10c1, 10c2).

Here, the corner of the block 5c means a corner formed between the ground contacting top surface 11 of the block 5c and a side wall surface 12 of the block 5c facing the lateral groove 4c.

With respect to each of the lateral grooves 4c, the corner of the hexagonal block 5c1 abutting on the lateral groove 4c on one side in the tire circumferential direction is provided with a chamfered part 10c1, and the corner of the hexagonal block 5c2 abutting on the lateral groove 4c on the other side in the tire circumferential direction is provided with a chamfered part 10c2, wherein the chamfered parts 10c1 on the one side and the chamfered parts 10c2 on the other side are disposed at different positions in the length direction of the lateral groove 4c.

By arranging in this way, the resistance to stone entrapment is improved, while keeping the total length of the chamfered parts small.

It is preferable that the chamfered parts 10c1 is substantially not overlap with the chamfered parts 10c2 in the length direction of the lateral groove 4c.

The length L10 of each of the chamfered parts 10c1 and 10c2 measured at the position of the corner 13 along the lateral groove 4c is preferably set in a range from 40 to 60% of the length L13 of the corner 13 measured along the lateral groove 4c.

If the length L10 is less than 40% of the length L13, there is a possibility that the resistance to stone entrapment is not sufficiently exhibited.

If the length L10 exceeds 60%, the ground pressure becomes excessively high at the corner 13 which is not chamfered, and uneven wear such as heel-and-toe wear tends to occur.

From such viewpoints, the length L10 is preferably set to be not less than 45% but preferably not more than 55% of the length L13.

It is not essential, but preferable that the length L10 of the chamfered parts 10c1 is equal to the length L10 of the chamfered parts 10c2.

In the cross section perpendicular to the lateral groove 4c, the angle θ of the chamfered part 10c1, 10c2, is preferably set in a range from 10 to 30 degrees with respect to a normal line to the ground contacting top surface 11 of the block.

If the angle θ is less than 10 degrees, the effect of chamfering decreases and the resistance to stone entrapment decreases.

If the angle θ exceeds 30 degrees, the wear resistance decreases because the ground contact area decreases.

From such viewpoints, the angle θ is preferably not less than 15 degrees, but preferably not more than 25 degrees.

It is not essential, but preferable that the angle θ of the chamfered part 10c1 is equal to the angle θ of the chamfered part 10c2.

It is preferable that the chamfered parts 10c1 and 10c2 have a depth D10 (radial dimension shown in FIG. 6) in a range from 50% to 80% of the above-said depth D2 of the lateral grooves 4.

If the depth D10 is less than 50% of the depth D2, the effect of chamfering decreases and the resistance to stone entrapment decreases. If the depth D10 exceeds 80%, wear resistance decreases as the ground contact area decreases.

From such viewpoints, the depth D10 is preferably not less than 55%, but preferably not more than 75% of the depth D2.

It is not essential, but preferable that the depth D10 of the chamfered part 10c1 is equal to the depth D10 of the chamfered part 10c2.

Similarly, in each of the middle land portions Rm, as shown in FIG. 5(B), corners of the hexagonal blocks 5m which corners abut on the lateral grooves 4m are each partially chamfered to have a chamfered part (10m1, 10m2).

Here, the corner of the block 5m means a corner formed between the ground contacting top surface 11 of the block 5m and a side wall surface 12 of the block 5m facing the lateral groove 4m. With respect to each of the lateral grooves 4m, the corner of the hexagonal block 5m1 abutting on the lateral groove 4m on one side in the tire circumferential direction is provided with a chamfered part 10m1, and the corner of the hexagonal block 5m2 abutting on the lateral groove 4m on the other side in the tire circumferential direction is provided with a chamfered part 10m2, wherein the chamfered parts 10m1 on the one side and the chamfered parts 10m2 on the other side are disposed at different positions in the length direction of the lateral groove 4m.

For the same reason as the chamfered parts 10c1 and 10c2, the length L10 of the chamfered parts 10m1 and 10m2 is preferably set in a range from 40% to 60% of the length L13 of the corner 13. The angle θ (not shown) of the chamfered part 10m1, 10m2 is preferably set in a range from 10 to 30 degrees. The depth D10 (not shown) of the chamfered part 10m1, 10m2 is preferably set in a range from 50% to 80% of the depth D2 of the lateral grooves 4m.

In the tire 1 according to the present invention, it is also possible that only the hexagonal blocks 5c in the center land portion Rc are provided with the chamfered parts 10c1 and 10c2, or only the in hexagonal blocks 5m in the middle land portions Rm are provided with the chamfered parts 10m1 and 10m2.

In this example, as shown in FIGS. 5(A) and 5(B), the hexagonal blocks 5c and 5m are provided with sipes 14c and 14m, respectively, so as to extend across the hexagonal blocks 5c and 5m in a tire axial direction.

The sipe 14c extends across the wide section of the hexagonal block 5c. Specifically, the sipe 14c intersects with the crown circumferential grooves 6 on both sides, and both ends of the sipe 14c are positioned in the vicinities of the axially outwardly protruding vertices Pao of the vertices Pa of the respective crown circumferential grooves 6.

Here, the "vicinity" means that the circumferential distance from the vertex Pao is not more than 10% of the circumferential length LB of the hexagonal block 5c.

The sipe 14c moderately relaxes the rigidity of the hexagonal block 5c. This makes the hexagonal block 5c easier to move in a direction that opens the sipe 14c, and thereby, stones trapped in the lateral groove 4c can be ejected easier. The sipes 14c are preferably inclined in the same direction as the lateral grooves 4c, in particular parallel to the lateral grooves 4c.

The sipes 14m is similar to the sipe 14c, and extends across the wide section of the hexagonal block 5m. The sipe 14m intersects with the crown circumferential groove 6 at its one end positioned in the vicinity of the axially inwardly protruding vertex Pai of the vertices Pa of the crown circumferential grooves 6, and intersects with the shoulder circumferential groove 7 at the other end positioned in the vicinity of the axially outwardly protruding vertex Pbo of the vertices Pb of the shoulder circumferential groove 7.

It is preferable that the sipes 14m are inclined in the same direction as the lateral grooves 4m, in particular parallel to the lateral grooves 4m.

The sipe 14m moderately relaxes the rigidity of the hexagonal block 5m, and improves the resistance to stone entrapment.

It is preferable that the sipes 14c and 14m are zigzag sipes extending zigzag in the respective longitudinal directions from the viewpoint of suppression of crack generation at the bottoms of the sipes.

The number of the crown circumferential grooves 6 may be three although not shown. In this case, the crown circumferential grooves 6 are one crown circumferential groove 6 extending on the tire equator C, and two crown circumferential grooves 6 disposed one on each side of the tire equator C.

While detailed description has been made of preferable embodiments of the present invention, the present invention can be embodied in various forms without being limited to the illustrated embodiment.

Comparison Tests

Based on the tread pattern shown in FIG. 1, heavy duty tires of size 215/75R17.5 (rim size 6.0×17.5) were experimentally manufactured as working example tires Ex1-Ex16 and comparative example tires Ref1 and Ref2, and tested for the wear resistance, resistance to stone entrapment, and uneven wear resistance. Except for specifications shown in Table 1, all the test tires had substantially the same structure.

(1) Wear Resistance Test

Using a 4 ton truck whose all wheels were mounted with the test tires, center wear was measured on the tires mounted on the rear driving wheels after running on general roads for 50000 km under the following conditions: Tire pressure 700 kPa, Vehicle loading 2 tons.

Here, the center wear means the average depth of the crown circumferential grooves remained after running for 50000 km. The results are indicated in Table 1 by an index based on Working example tire Ex1 being 100, wherein the larger the numerical value, the higher the wear resistance (center wear resistance).

(2) Resistance to Stone Entrapment Test

Using the above-mentioned truck with no vehicle loading, after running for 100 km on a tire test course including a gravel road, the number of stones entrapped in the lateral grooves disposed in the center land portion of the rear driving wheel tire was counted. The result is evaluated by the reciprocal of the number of stone entrapped, and it is indicated in Table 1 by an index based on Working example tire Ex1 being 100, wherein the larger the numerical value, the higher the resistance to stone entrapment.

(3) Uneven Wear Resistance (Heel and Toe Wear Resistance) Test

After the above-mentioned wear resistance test was completed, the amount of heel-and-toe wear of the hexagonal blocks disposed in the center land portion was measured.

The result is evaluated by the reciprocal of the amount of heel-and-toe wear, and it is indicated by an index based on working example tire Ex1 being 100, wherein the larger the numerical value, the higher the heel-and-toe wear.

TABLE 1

| Tire | Ref1 | Ex1 | Ex2 | Ex3 | Ex4 | Ex5 | Ex6 | Ex7 | Ex8 |
|---|---|---|---|---|---|---|---|---|---|
| crown circumferential groove width Wc (mm) | 2.0 | 2.0 | 2.0 | 2.0 | 2.0 | 2.0 | 2.0 | 2.0 | 2.0 |
| block corner length L13 (mm) | 32 | 32 | 32 | 32 | 32 | 32 | 32 | 32 | 32 |
| chamfered parts 10 | none | | | | | | | | |
| length L10 (mm) | — | 16 | 10 | 12.5 | 19 | 25.5 | 16 | 16 | 16 |
| L10/L13 | — | 0.50 | 0.50 | 0.50 | 0.50 | 0.50 | 0.50 | 0.50 | 0.50 |
| depth D10/D2 | — | 0.65 | 0.65 | 0.65 | 0.65 | 0.65 | 0.30 | 0.50 | 0.80 |
| angle θ (deg.) | — | 20 | 20 | 20 | 20 | 20 | 20 | 20 | 20 |
| sipes 14c, 14m | | | | | | | | | |
| wear resistance | 100 | 100 | 100 | 100 | 100 | 100 | 100 | 100 | 95 |
| resistance to stone entrapment | 70 | 100 | 90 | 95 | 100 | 100 | 90 | 95 | 110 |
| uneven wear resistance | 100 | 100 | 100 | 100 | 95 | 90 | 100 | 100 | 100 |

| Tire | Ex9 | Ex10 | Ex11 | Ex12 | Ex13 | Ex14 | Ex15 | Ex16 | Ref2 |
|---|---|---|---|---|---|---|---|---|---|
| crown circumferential groove width Wc (mm) | 2.0 | 2.0 | 2.0 | 2.0 | 2.0 | 2.0 | 3.0 | 5.0 | 5.0 |
| block corner length L13 (mm) | 32 | 32 | 32 | 32 | 32 | 32 | 32 | 32 | 32 |
| chamfered parts 10 | | | | | | | | | none |
| length L10 (mm) | 16 | 16 | 16 | 16 | 16 | 16 | 16 | 16 | — |
| L10/L13 | 0.50 | 0.50 | 0.50 | 0.50 | 0.50 | 0.50 | 0.50 | 0.50 | — |
| depth D10/D2 | 0.90 | 0.65 | 0.65 | 0.65 | 0.65 | 0.65 | 0.65 | 0.65 | — |
| angle θ (deg.) | 20 | 5 | 10 | 30 | 40 | 20 | 20 | 20 | — |
| sipes 14c, 14m | | | | | | none | | | |
| wear resistance | 90 | 100 | 100 | 95 | 90 | 110 | 100 | 95 | 80 |
| resistance to stone entrapment | 120 | 90 | 95 | 110 | 120 | 90 | 100 | 110 | 80 |
| uneven wear resistance | 100 | 100 | 100 | 100 | 100 | 100 | 100 | 100 | 100 |

As shown in Table 1, it was confirmed that the example tires according to the present invention were improved in the resistance to stone entrapment.

DESCRIPTION OF THE REFERENCE SIGNS 1 tire
2 tread portion
3 zigzag circumferential groove
4, 4c, 4m lateral groove
5, 5c, 5m hexagonal block
6 crown circumferential groove
7 shoulder circumferential groove
10 chamfered part
11 ground contacting top surface
12 side wall surface
13 corner
14c, 14m sipe
Pa, Pb vertex

The invention claimed is:

1. A tire comprising a tread portion provided with
zigzag circumferential grooves each extending in the tire circumferential direction in a zigzag manner so as to have zigzag vertices, and
lateral grooves extending straight and continuously between two of the axially adjacent zigzag circumferential grooves from the respective zigzag vertices of one of the two zigzag circumferential grooves to the respective zigzag vertices of the other of the two zigzag circumferential grooves while inclining in one direction obliquely with respect to the tire axial direction so that a land portion defined between the two zigzag circumferential grooves is circumferentially divided into hexagonal blocks each wider in a central portion in the tire circumferential direction than both sides of the central portion in the tire circumferential direction, wherein
with respect to each of the lateral grooves, corners of the hexagonal blocks adjacent to each other through the lateral groove are partially chamfered to have chamfered parts extending along the longitudinal direction of the lateral groove, wherein the corner of each said hexagonal block is defined as being formed between a ground contacting top surface of the hexagonal block and a side wall surface of the hexagonal block facing the lateral groove, and
each of the chamfered parts has an edge, at which the chamfered part intersects with the ground contacting top surface of the hexagonal block, and a length of each edge, being a longest extent of the respective edge, extends in parallel with the longitudinal direction of the lateral groove,
with respect to each of the lateral grooves, the chamfered part of the corner of the hexagonal block abutting on the lateral groove on one side in the tire circumferential direction is located in a different position in the longitudinal direction of the lateral groove than the chamfered part of the corner of the hexagonal block abutting on the lateral groove on the other side in the tire circumferential direction, and with respect to each of the corners of the hexagonal blocks, a length L10 of the chamfered part, which is measured along the longitudinal direction of the adjacent lateral groove, is in a range from 40% to 60% of a length L13 of the corner, which is measured along the longitudinal direction of the adjacent lateral groove.

2. The tire according to claim 1, wherein
the zigzag circumferential grooves include two shoulder circumferential grooves and two or three crown circumferential grooves disposed therebetween, and
the two shoulder circumferential grooves have a wider groove width than groove widths of the crown circumferential grooves.

3. The tire according to claim 2, wherein
the crown circumferential grooves have a groove width of not more than 3.0 mm.

4. The tire according to claim 3, wherein
the groove width We of the crown circumferential grooves is not less than 1.0 mm.

5. The tire according to claim 2, wherein
said land portion divided into the hexagonal blocks is formed between the crown circumferential grooves and further formed between the crown circumferential grooves and the shoulder circumferential grooves.

6. The tire according to claim 1, wherein
the chamfered parts each have an angle θ in a range from 10 to 30 degrees with respect to a normal line to the block's ground contacting top surface.

7. The tire according to claim 1, wherein
the hexagonal blocks are each provided with a sipe extending across the hexagonal block in the tire axial direction.

8. The tire according to claim 1, wherein
the lateral grooves include central lateral grooves each extending across the tire equator, and middle lateral grooves disposed on each side in the tire axial direction of the central lateral grooves, and
the central lateral grooves are inclined with respect to the tire axial direction to one direction at an angle in a range from 4 to 18 degrees, and the middle lateral grooves are inclined with respect to the tire axial direction to one direction opposite to the central lateral grooves at an angle in a range from 4 to 18 degrees.

9. The tire according to claim 1, wherein
the zigzag circumferential grooves are two wide shoulder circumferential grooves and two narrow crown circumferential grooves disposed therebetween.

10. The tire according to claim 9, wherein
said land portion divided into the hexagonal blocks is formed between the two narrow crown circumferential grooves and further formed between each of the two narrow crown circumferential grooves and the adjacent one of the two wide shoulder circumferential grooves.

11. The tire according to claim 10, wherein
the lateral grooves are inclined at an angle in a range from 4 to 18 degrees with respect to the tire axial direction,
the lateral grooves include central lateral grooves extending between the two narrow crown circumferential grooves, and middle lateral grooves extending between said each of the two narrow crown circumferential grooves and said adjacent one of the two wide shoulder circumferential grooves, and
the central lateral grooves are inclined to one side in the tire circumferential direction whereas the middle lateral grooves are inclined to the other side in the tire circumferential direction, while each extending from one side to the other side in a tire width direction orthogonal to the tire circumferential direction.

12. The tire according to claim 11, wherein
the hexagonal blocks are each provided with a sipe extending zigzag between mostly axially protruding positions of both side faces of the hexagonal block.

13. The tire according to claim 10, wherein
in the plan view of the tread portion, the chamfered part has a substantially constant width along the longitudinal direction of the lateral groove which width is wider than the groove width of the two narrow crown circumferential grooves and narrower than the groove width of the lateral groove.

14. The tire according to claim 10, wherein
the chamfered parts each have an angle θ in a range from 10 to 30 degrees with respect to a normal line to the block's ground contacting top surface.

15. The tire according to claim 14, wherein
the depth D10 of the chamfered parts is in a range from 50% to 80% of the depth D2 of the adjacent lateral groove.

16. The tire according to claim 10, wherein
the hexagonal blocks are each provided with a sipe extending zigzag between mostly axially protruding positions of both side faces of the hexagonal block.

17. The tire according to claim 6, wherein
the depth D10 of the chamfered parts is in a range from 50% to 80% of the depth D2 of the adjacent lateral groove.

18. The tire according to claim 1, wherein
the maximum axial width of each of the hexagonal blocks measured axially between mostly axially protruding positions of both side faces of the hexagonal block is in a range from 1.2 to 1.5 times an axial width of the hexagonal block at each of ends in the tire circumferential direction.

19. The tire according to claim 1, wherein
the hexagonal blocks are each provided with a sipe extending zigzag between mostly axially protruding positions of both side faces of the hexagonal block.

20. The tire according to claim 14, wherein in a cross-section of the lateral groove including the chamfered part, one of two side walls of the lateral groove comprises a radially outer portion forming the chamfered part and a radially inner portion less inclined than the radially outer portion, and the other of the two side walls has an inclination angularly corresponding to the radially inner portion.

* * * * *